S. M. & G. E. PALMER.
LATH MACHINE.
No. 104,637.  Patented June 21, 1870.
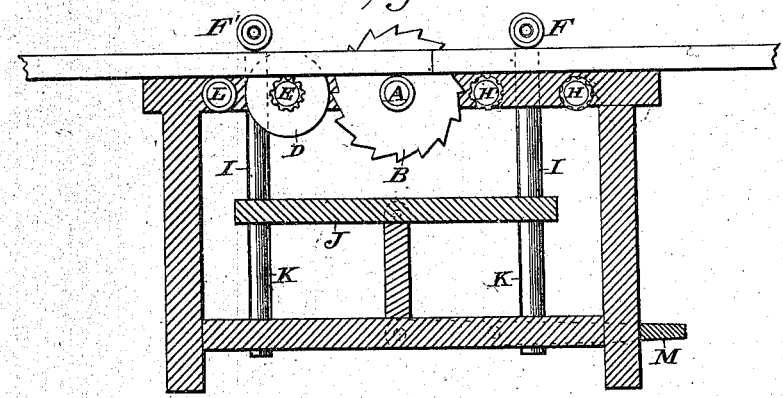
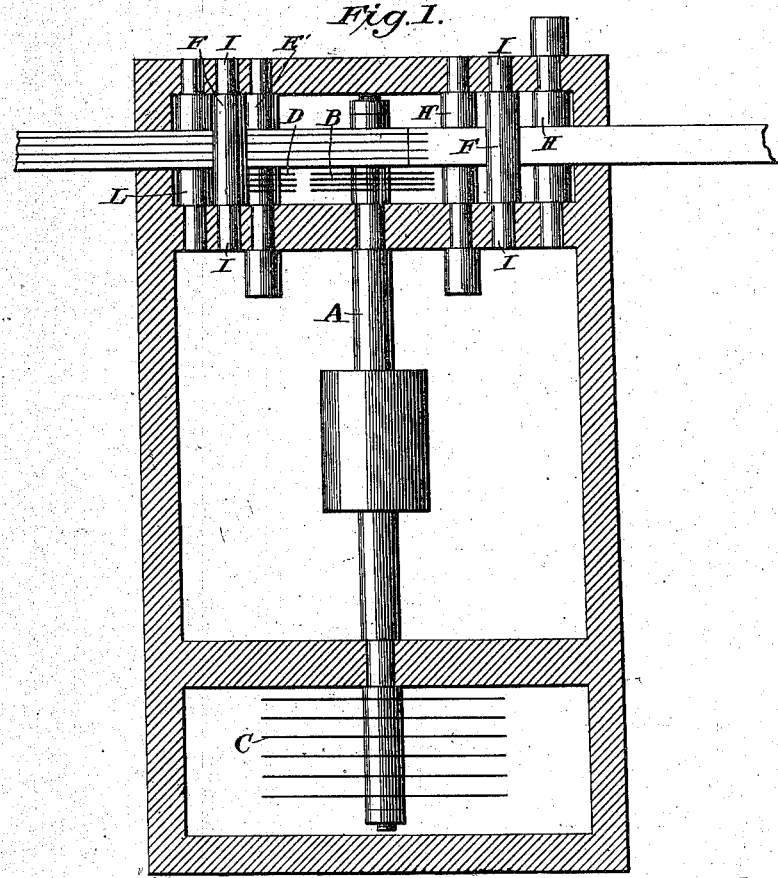
Witnesses:  Inventors,

United States Patent Office.

SAMUEL M. PALMER AND GEORGE E. PALMER, OF SANDY HILL, NEW YORK.

Letters Patent No. 104,637, dated June 21, 1870.

IMPROVEMENT IN LATH-MACHINE.

The Schedule referred to in these Letters Patent and making part of the same

*To all whom it may concern:*

Be it known that we, SAMUEL M. PALMER and GEORGE E. PALMER, of Sandy Hill, in the county of Washington and State of New York, have invented a new and useful Machine for Manufacturing Lath, Staves, and other lumber of a similar kind or form; and we do hereby declare that the following is a full, clear, and exact description of the construction and operation of the same, reference being had to the annexed drawing making a part of this specification, and to the letters of reference marked thereon, in which—

Figure 1 is a plan, and
Figure 2 a transverse section.

The nature of our invention consists in the combination and arrrangement of devices hereinafter described, for cutting lath, staves, and other lumber of a similar form.

To enable others skilled in the art to make and use our invention, we will proceed to describe its construction and operation.

We place on one end of the arbor A a gang of saws, two or more, as seen at C, for sawing bolts.

Also, on the other end of the arbor A, a gang of two or more saws, B, for sawing lath.

We use three fluted feed-rollers H, H', and E, and two smooth press-rollers, F and F', and one bearing-roller, L.

The position of the feed-rollers and press-rollers is such that no table board is required. The space between the saws in the gang is entirely open, so that all loose pieces, such as slivers and knots that are loosened and become detached in sawing may drop through the space between the saws more readily and more safely than they could if the saws were running in a slotted table-board; also, the arrangement of sawing without a table-board allows the radius of the saws to be diminished equal to the thickness of the table-board; also, it enables the operator to remove the saws for the purpose of filing or for placing them wider apart or nearer together on the arbor, so as to saw lumber of different thickness without disturbing or moving any other piece or part of the machine.

Around or near the feed-roller E are placed two or more guides, D, which are not attached to the feed-roller E, but to the frame-work of the machine, and have a length sufficient to reach above the bolt, being sawed far enough to be firmly held in place at that point, and they are placed in a line with the saws B in the gang, and are of the right thickness to touch slightly against the lath as it passes from the saws in the gang, and are designed to hold the lath from falling or canting over onto the flat side, keeping each piece of lath perpendicular on its edge.

The press-rollers F and F' have their journals attached to a frame, J, with rods I I I I held in their places by boxes or guides, so that they can only move up and down; also, held at the bottom by the lower rods K K, which lower rods K K are held by guides or boxes, so that they can only move up and down, and are moved up and down by a lever, M, worked by hand or foot.

The whole frame J, and rods I I I I and rods K K, being combined with the press-rollers F and F', so as to hold the press-rollers exactly level and parallel, the whole to be of sufficient weight to hold the bolt firmly onto the feed-rollers as it passes through the machine in the process of being sawed into lath.

The gang of bolting saws C is to be arranged in combination with feed-rollers, revolving guard, press-rollers, and bearing-roll, in the same manner as the gang of saws for lath above described.

What we claim as our invention, and desire to secure by Letters Patent, is—

1. The arbor A, bolting-saws C, and lath-saws B, in combination with the feed-rollers H, H', and E, press-rollers F and F', bearing-roll L, and the guides D, when constructed substantially as and for the purposes specified.

2. The press-rollers F and F', in connection with the adjustable frame J and guide-rods I I I I and K K, in the manner and for the purposes described.

SAMUEL M. PALMER.
GEORGE E. PALMER.

Witnesses:
J. K. PIXLEY,
A. M. CLEMENTS.